United States Patent [19]

Sasaoka et al.

[11] 4,207,506

[45] Jun. 10, 1980

[54] SERVO SYSTEM WITH REDUCTION OF TRANSIENT ERROR AND SETTLING TIME

[75] Inventors: Hisashi Sasaoka; Akira Nagayama, both of Tokyo, Japan

[73] Assignee: Nippon Telegraph and Telephone Public Corporation, Tokyo, Japan

[21] Appl. No.: 4,570

[22] Filed: Jan. 18, 1979

[30] Foreign Application Priority Data

Jan. 31, 1978 [JP] Japan .................................. 53-9597

[51] Int. Cl.² ............................................. G05B 5/01
[52] U.S. Cl. .................................... 318/620; 318/632; 318/307
[58] Field of Search ............... 318/561, 615, 620, 632, 318/307

[56] References Cited

U.S. PATENT DOCUMENTS

| | | | |
|---|---|---|---|
| 3,252,101 | 5/1966 | Gorbatenko | 318/561 |
| 3,493,826 | 2/1970 | Wandrey | 318/620 |
| 3,622,767 | 11/1971 | Koepcke | 318/561 |
| 4,051,423 | 9/1977 | Touchton et al. | 318/620 |

*Primary Examiner*—J. V. Truhe
*Assistant Examiner*—Eugene S. Indyk
*Attorney, Agent, or Firm*—Burgess, Ryan and Wayne

[57] ABSTRACT

A servo system wherein an actuating signal obtained by the subtraction of a controlled variable delivered from a controlled system from a secondary command variable is applied to the controlled system, the actuating signal is added to the command to provide a secondary command variable, and the command is compared with the controlled variable in such a manner that when they are coincident with each other, the control is effected so as to change the secondary command variable to a predetermined value, thereby reducing both the transient error and the transient or settling time to a minimum and consequently decreasing the steady state error to a minimum.

7 Claims, 25 Drawing Figures

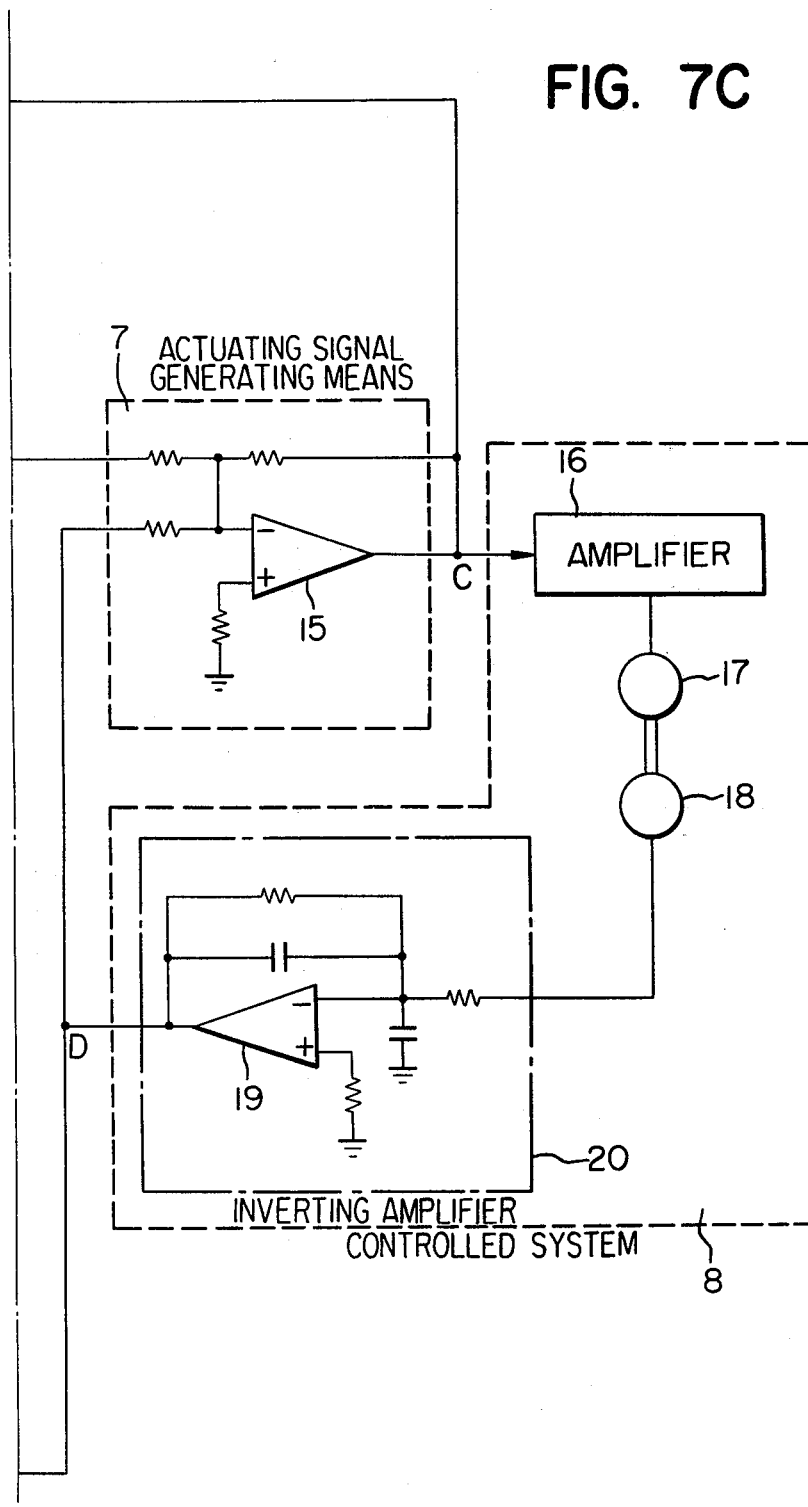

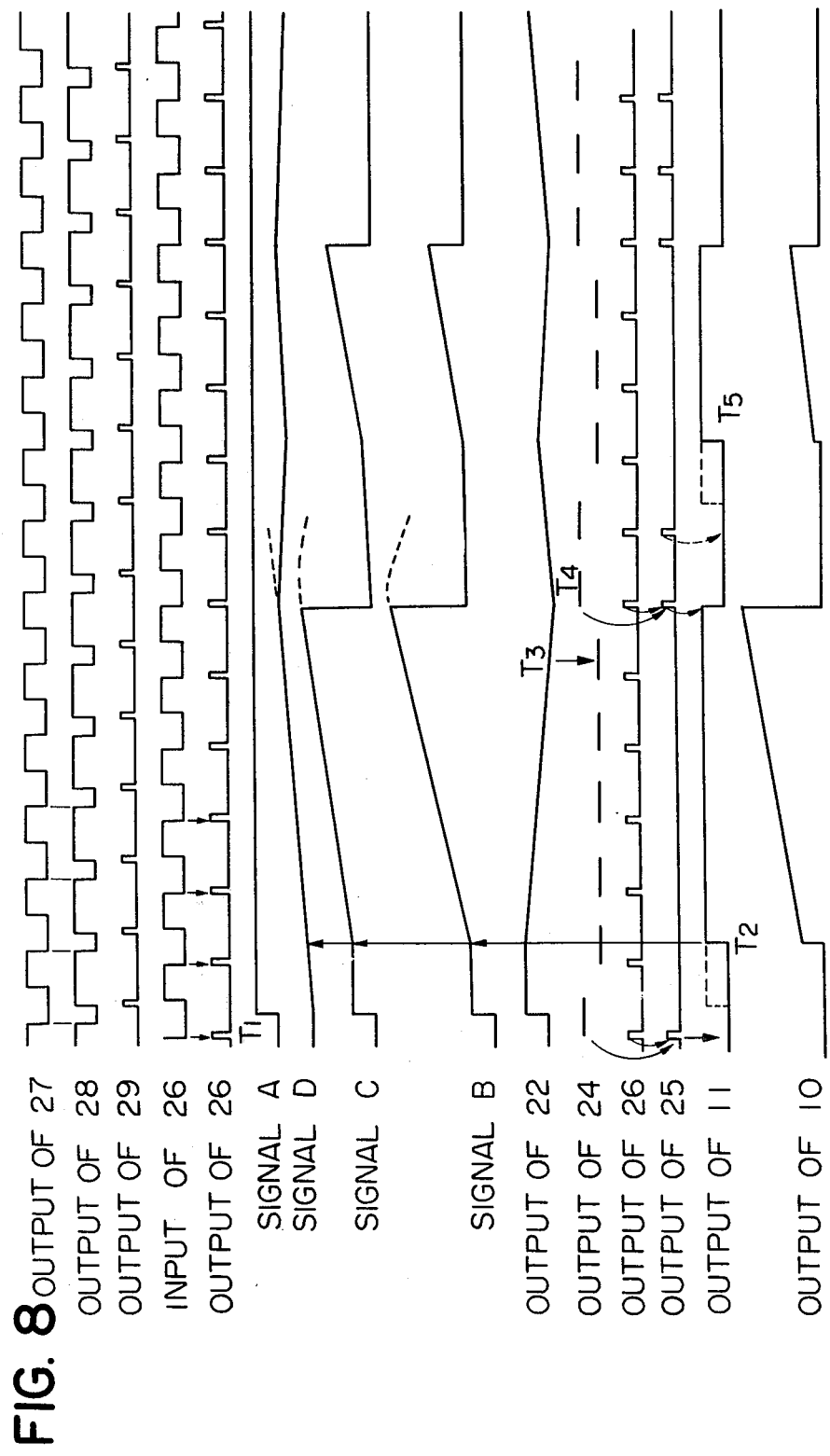

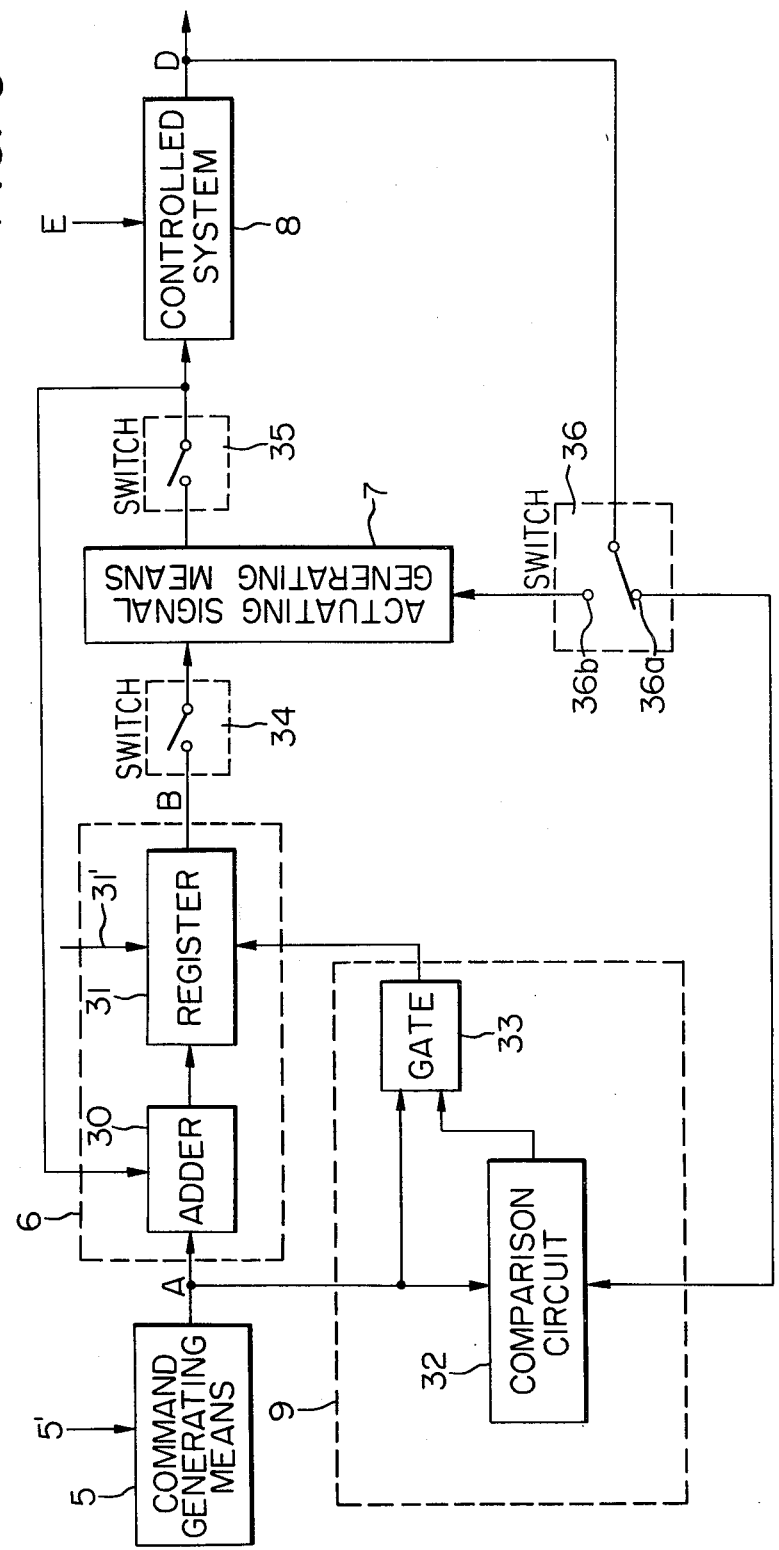

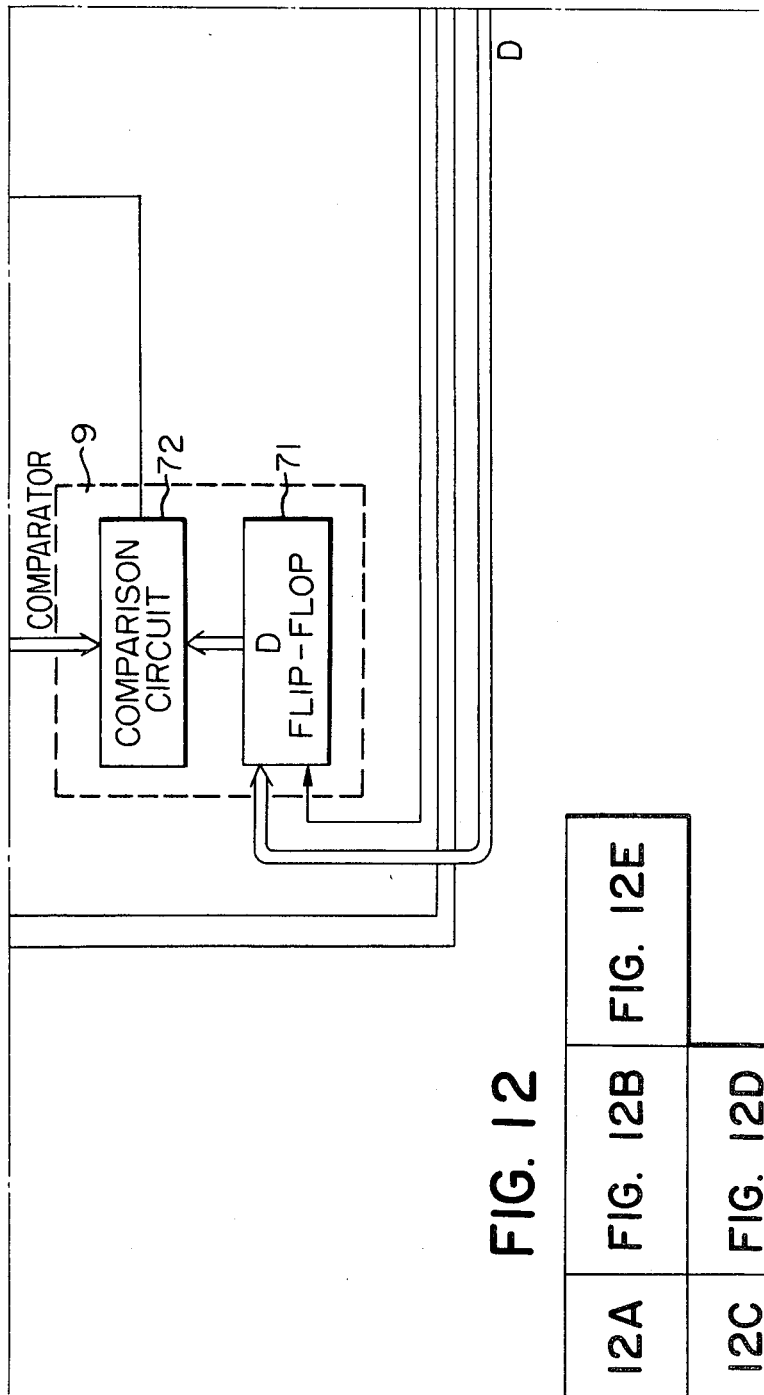

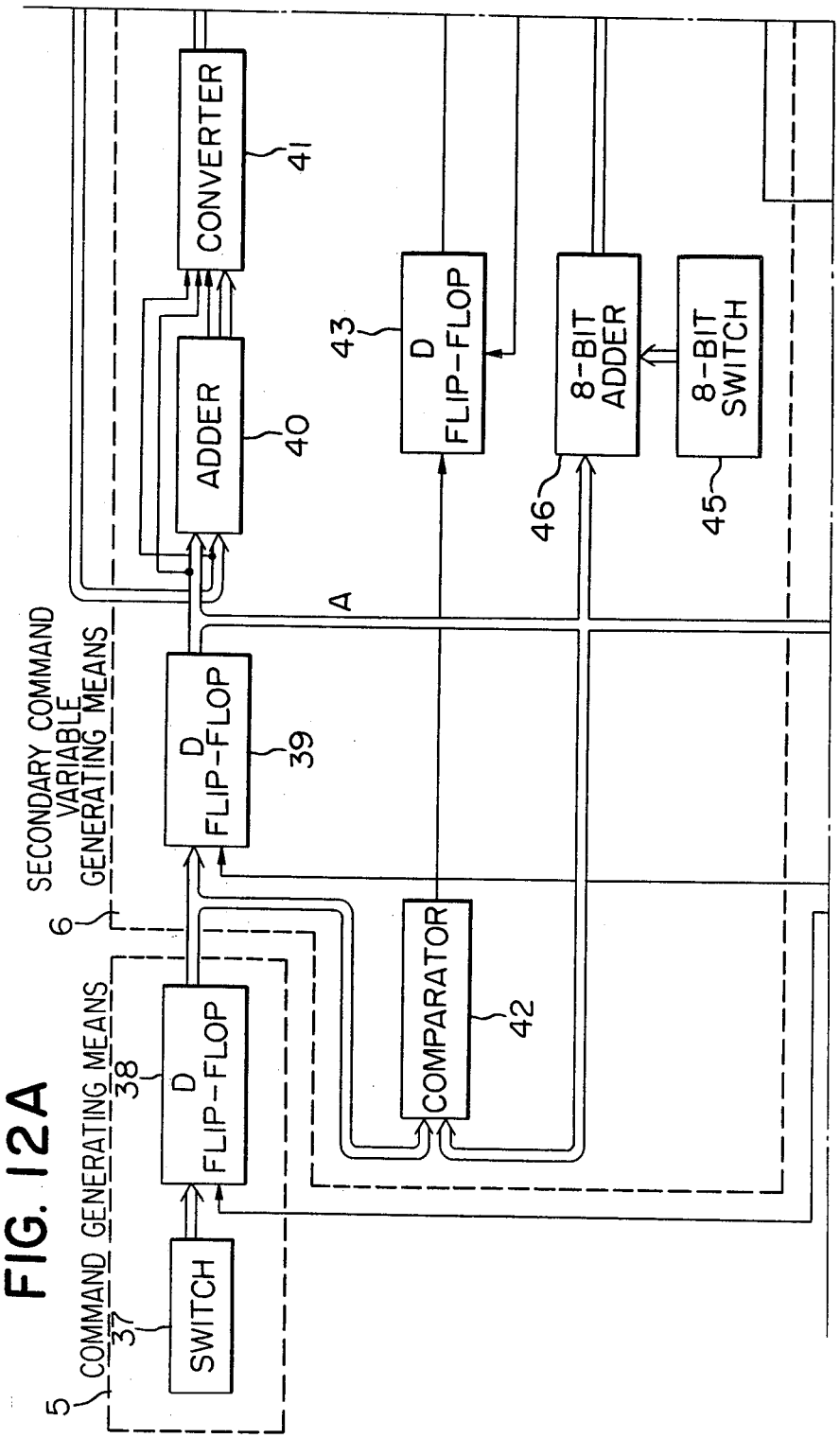

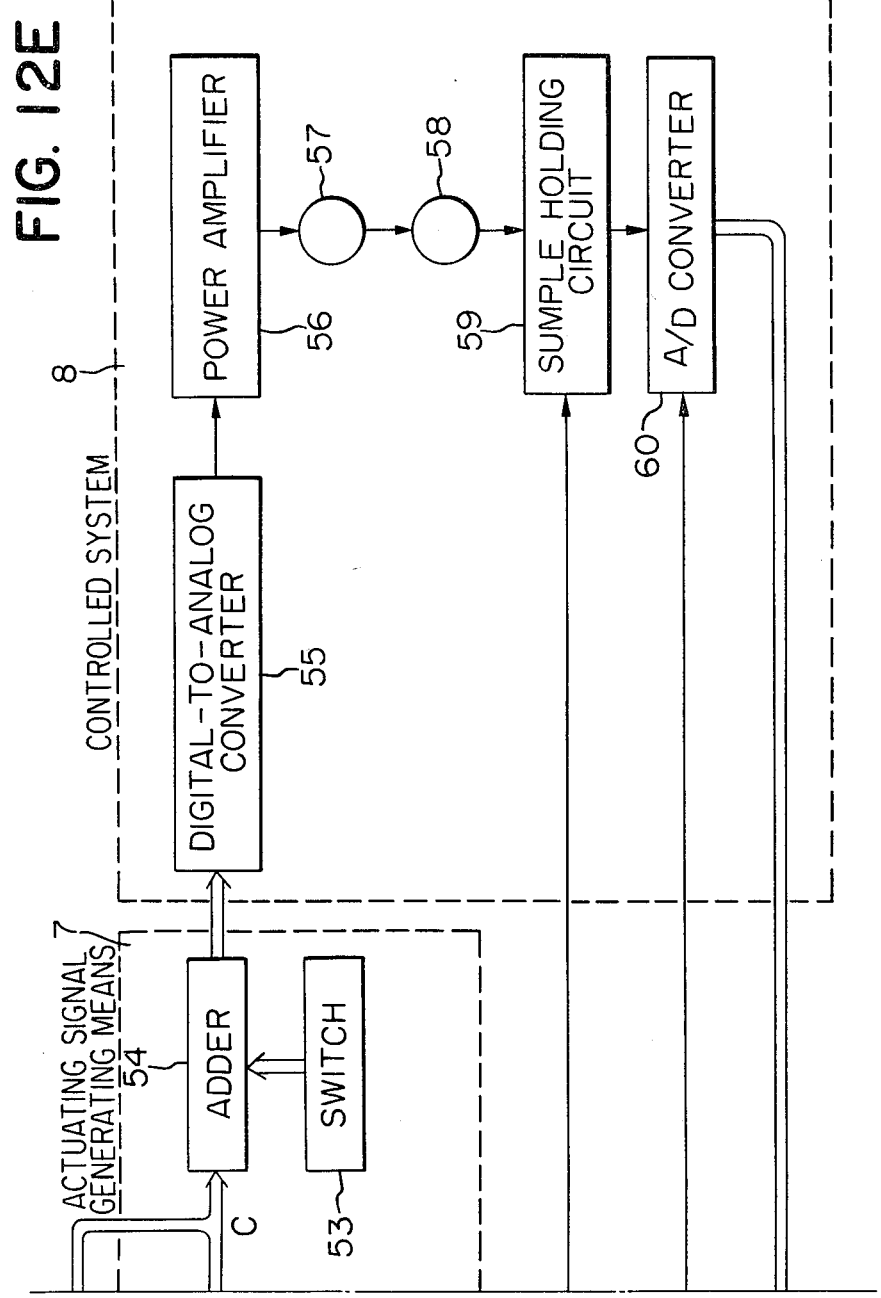

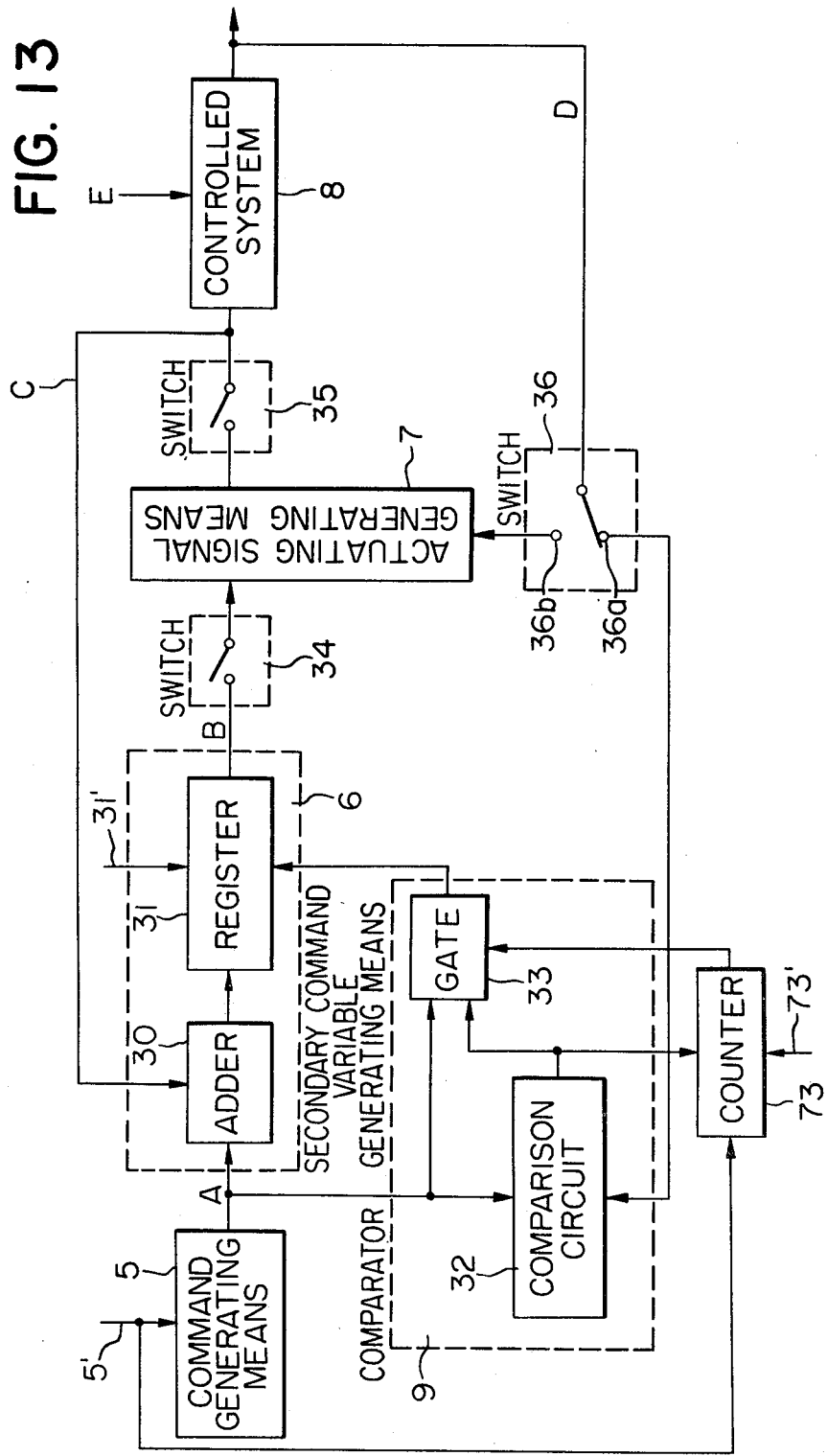

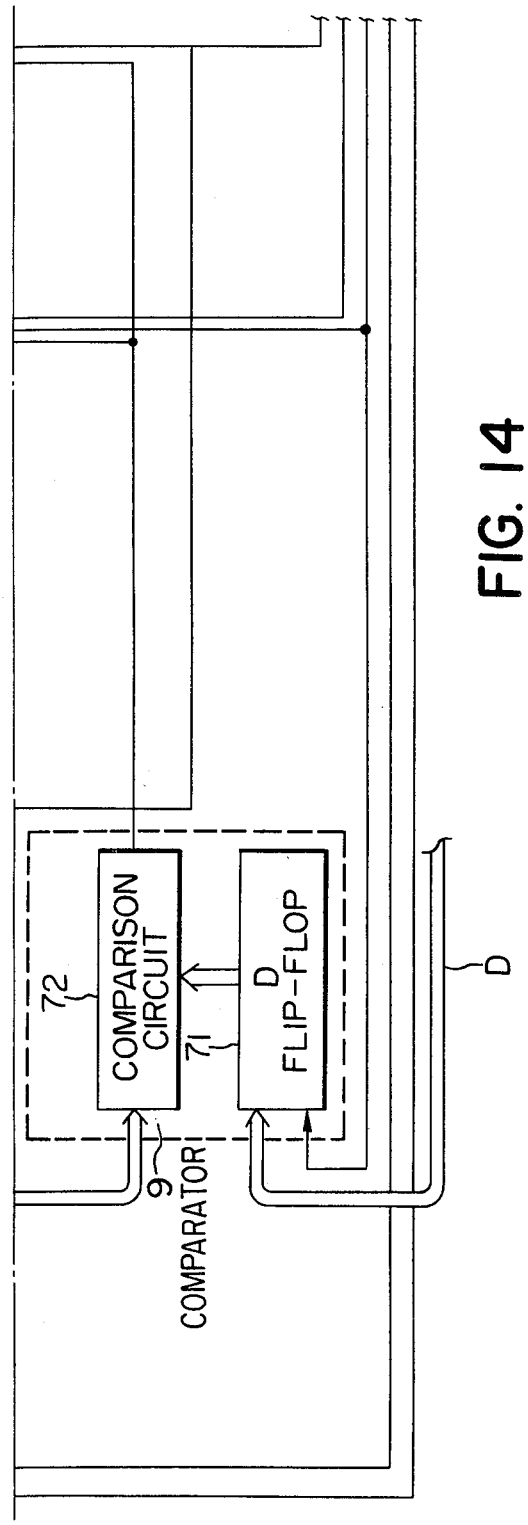
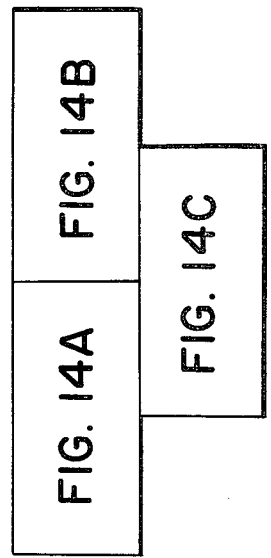

SERVO SYSTEM WITH REDUCTION OF TRANSIENT ERROR AND SETTLING TIME

BACKGROUND OF THE INVENTION

The present invention relates to a servo system with a positive feedback loop.

There has been devised and demonstrated a servo system which, in addition to a negative feedback loop for applying to a controlled system an actuating signal which is the difference between a controlled variable, which is an output from the controlled system, and a secondary command variable, so as to approach the controlled variable to the secondary command variable, includes a positive feedback loop for generating the secondary command variable by adding to the command the difference obtained by subtracting the controlled variable from the secondary command variable. When this servo system is applied to a one-lag controlled system, the steady state error may be reduced to zero, but in response to a step change in the command, the response of the controlled variable becomes oscillatory. When a one-lag system with a large time constant is inserted into the positive feedback loop in order to avoid this oscillation, the settling time becomes longer.

As described above, the prior art servo system has the defects that the transient error is large and that the settling time is longer even though the steady state error may be reduced zero. Furthermore, when disturbance is applied to the controlled system, the transient error is large and the settling time is longer even though the steady state error becomes zero.

SUMMARY OF THE INVENTION

Accordingly, one of the objects of the present invention is to provide a servo system which may reduce both the transient error and the settling time to a minimum and may also decrease the steady state error to a minimum.

Another object of the present invention is to provide a servo system wherein when a controlled variable approaches a command, a secondary command variable which is obtained by the addition of an actuating signal to the command, is changed so as to compensate for the overshoot of the secondary command variable, thereby reducing both the transient error and the settling time to a minimum.

Briefly stated, the servo system in accord with the present invention comprises a command generating means, a secondary command variable generating means for generating a secondary command variable from a command and an actuating signal, an actuating signal generating means for generating said actuating signal by the subtraction of a controlled variable from the secondary command variable, a comparator means for comparing the command with the controlled variable, and means responsive to the output from said comparator means for controlling the secondary command variable generating means, thereby changing the secondary command variable.

BRIEF DESCRIPTION OF THE DRAWINGS

FIGS. 7 and 7A–7C are detailed circuit diagrams thereof;

FIG. 8 is wave forms used for the explanation of the mode of operation of the servo system shown in FIG. 7;

FIG. 9 is a block diagram of a second embodiment of a servo system in accord with the present invention;

FIGS. 12 and 12A–12E are detailed circuit diagrams of the servo system shown in FIG. 9;

FIG. 13 is a block diagram of a third embodiment of a servo system of the present invention, which is a modification of the servo system shown in FIG. 9; and FIGS. 14 and 14A–14C are detailed circuit diagrams thereof.

DESCRIPTION OF THE PREFERRED EMBODIMENT

Figure 1:
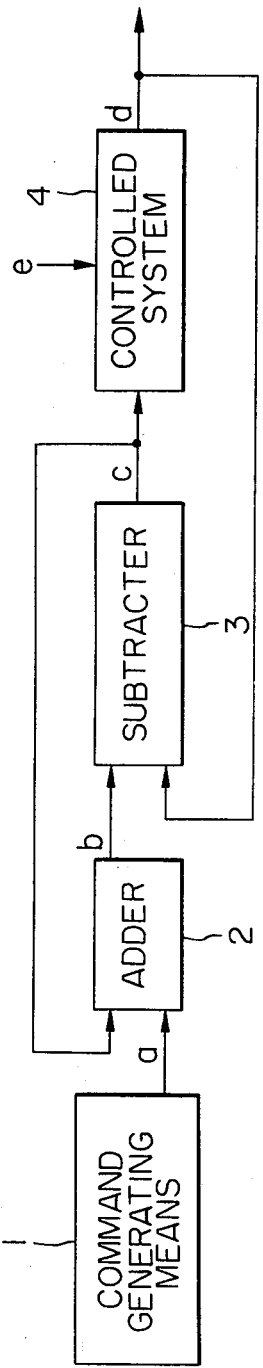
FIG. 1 is a block diagram of a prior art servo system.

Prior to the description of the preferred embodiments of the present invention, a prior art servo system will be described with reference to FIGS. 1–3. In FIG. 1, the command a from means 1 for generating a command (to be referred to as "the command generating means" hereinafter in this specification) is transmitted through an adder 2 and a subtractor 3 to a controlled system 4. The output d of the controlled system 4 is fed back to the subtracter 3 so as to be subtracted from the output b of the adder 2. The output c of the subtracter 3 is applied to the controlled system 4 and fed back to the adder 2 so as to be added to the command a.

Figure 2:
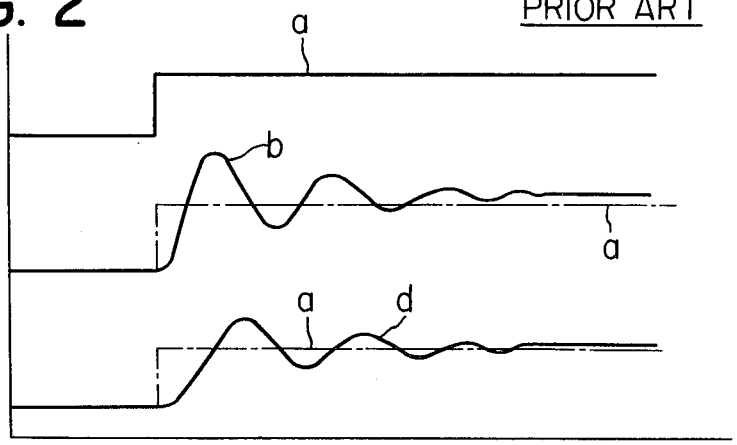
FIGS. 2 and 3 show waveforms used for the explanation of the servo system shown in FIG. 1.
Figure 3:
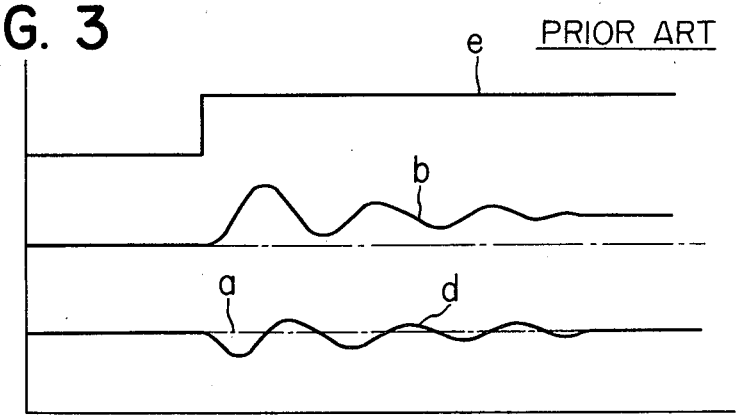

When the controlled system 4 in the above servo system is a one-lag system and when the output a of the command generating means 1 varies stepwise as shown in FIG. 2, the output d of the controlled system 4 oscillates. When the steady state is reached, the difference between the output d and the output a of the command generating means 1 becomes zero. In this case, the output b of the adder 2 is so slightly higher than the command a that the difference between the command a and the output d of the controlled system becomes zero. The time constant of the oscillatory damping of the output d of the controlled system 4 is greater than that of the controlled system 4. When the time constant of the one-lag system in the adder 2 is increased so as to increase the retardation or damping effect in order to avoid such oscillation, the time required for reaching the steady-state value becomes longer. As described above, in the servo system having not only the negative feedback loop but also the positive feedback loop, the stationary deviation between the output d of the controlled system 4 and the command a becomes zero, but there are defects that the transient error or deviation is greater and that the response time is slow. Furthermore as shown in FIG. 3, in response to the disturbance e to the controlled system 4, the output d varies. The stationary error or deviation becomes zero, but the transient error or deviation becomes greater and the time required to reach the steady-state value becomes longer.

Figure 4:
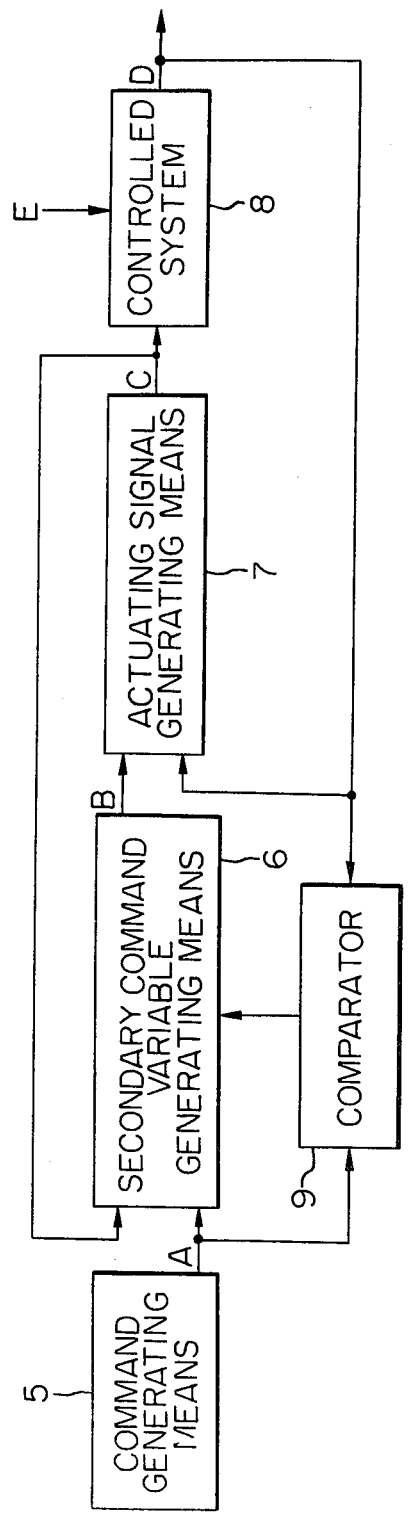
FIG. 4 is a block diagram used for the explanation of the underlying principle of the present invention.

Next referring to FIG. 4, the underlying principle of the present invention will be described. The command A or the output of a command generating means 5 is applied to a means 6 for generating a secondary command variable (to be referred to as "the secondary command variable generating means" hereinafter in this specification). The actuating signal C or the output of an actuating signal generating means 7 is applied not only to the secondary command variable generating means 6 but also to a controlled system 8. The controlled variable D or the output of the controlled system 8 is fed back not only to the actuating signal generating means 7 but also to a comparator 9. The actuating signal generating means 7 subtracts the controlled variable D from the secondary command variable B and applies the difference between them to the controlled system 8. The comparator 9 compares the command A from the command generating means 5 with the controlled variable D and applies the output F to the secondary command variable generating means 6 so as to manupulate the secondary command variable B.

Figure 5:
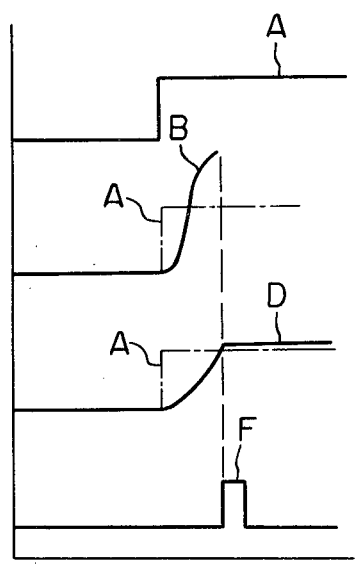
FIG. 5 shows wave forms used for the explanation of the mode of operation of the servo system shown in FIG. 4.

Referring further to FIG. 5, when the command A changes stepwise, the secondary command variable B increases rapidly, but the increase in the controlled variable D or the output from the controlled system 8, which is a one-lag system, lags behind that of the secondary command variable B. When the comparator 9 detects that the command A is not coincident with the controlled variable D, it gives no output, but when they are coincident with each other, it generates the signal F. Therefore the secondary command variable generating means 6 interrupts the actuating signal C or the output from the actuating signal generating means 7 so as to cause the secondary command variable B to reach the command A. Alternatively, it converts the actuating signal C into a constant, which in turn is added to the command A, whereby the difference between the command A and the controlled variable D may be reduced to zero. When the disturbance E is impressed to the controlled system 8, the difference between the command A and the controlled variable D may be reduced to zero in a manner substantially similar to that described above.

Figure 6:
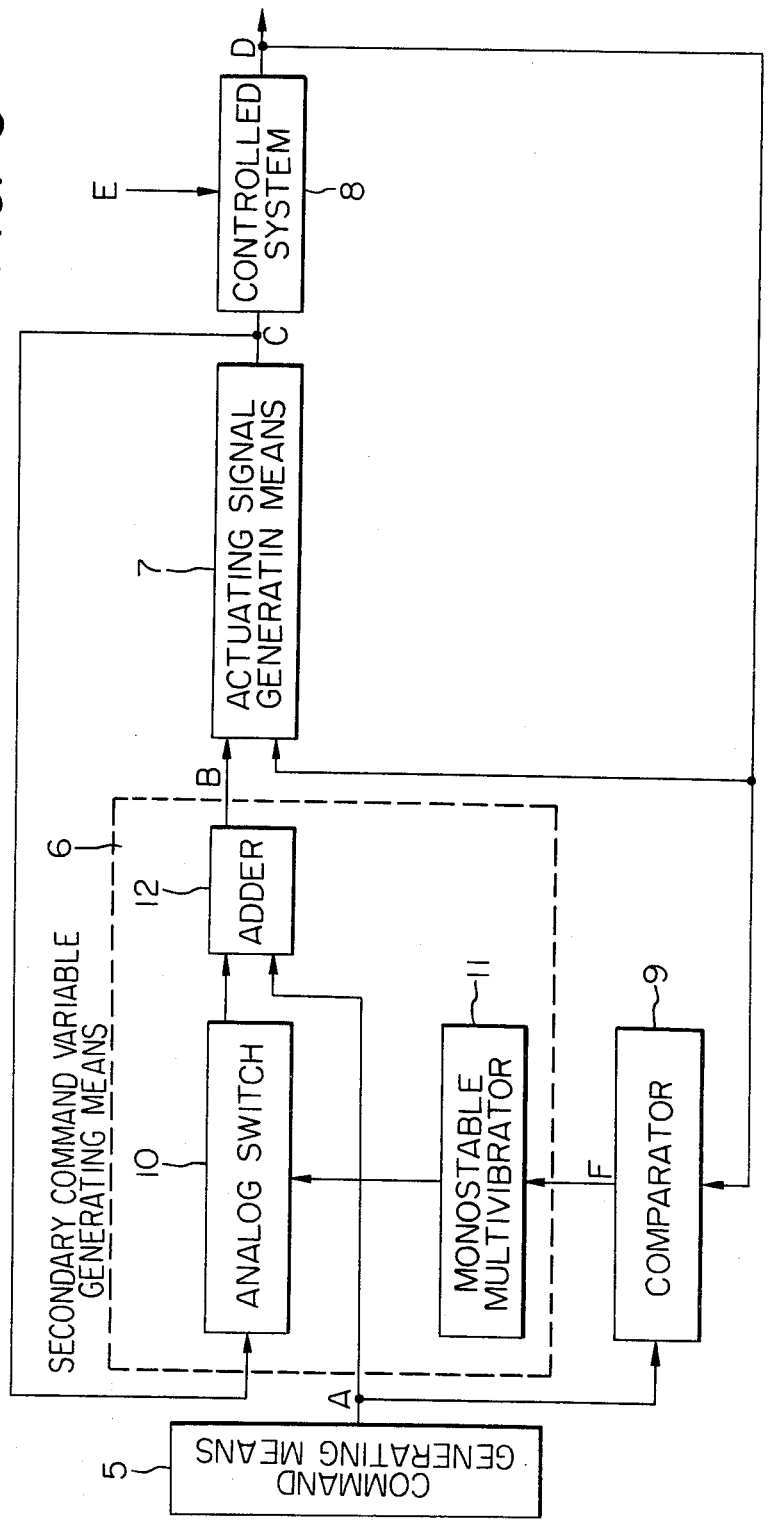
FIG. 6 is a block diagram of a first embodiment of a servo system in accord with the present invention.

The underlying principle of the present invention described above may be embodied into a practical system or a first preferred embodiment of the present invention with the use of analog circuits as shown in FIG. 6. The command generating means 5, the actuating signal generating means 7, the controlled system 8 and the comparator 9 have the functions described above. The secondary command variable generating means 6 comprises an analog switch 10 which selectively interrupts the actuating signal C from the actuating signal generating means 7, a monostable multivibrator 11 which responds to the output F from the comparator 9 so as to generate the output which lasts for a specified time interval, and an adder 12.

Next the mode of operation will be described. The command A from the command generating means 5 is transmitted through the analog adder 12 to the actuating signal generating means 7 where the controlled variable D from the controlled system 8 is subtracted from the secondary command variable B. The actuating signal C or the output of the actuating signal generating means 7 is applied through the analog switch 10 to the adder 12 and directly to the controlled system 8. The comparator 9 always compares the command A with the controlled variable D. When these signals coincide with each other, the comparator 9 applies its output to the monostable multivibrator 11 so that the latter generates the output which lasts for a specified time interval.

In response to the output from the monostable multivibrator 11, the analog switch 10 interrupts the actuating signal C and generates the zero or constant output so as to reduce the difference between the command A and the secondary command variable B to zero. Alternatively, a constant is added to the command A. Thus the overshoot of the controlled variable D over the command A may be prevented.

Figure 7A:
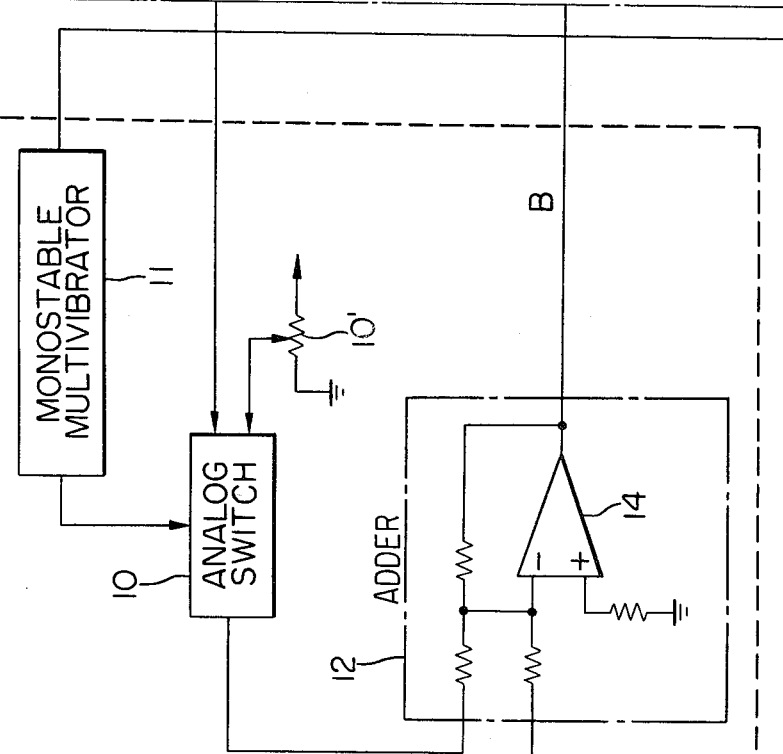
Figure 7:
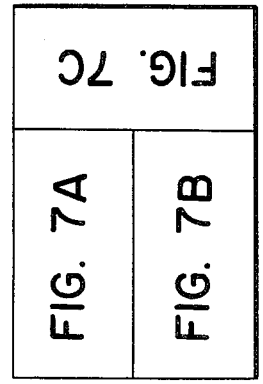
Figure 7B:
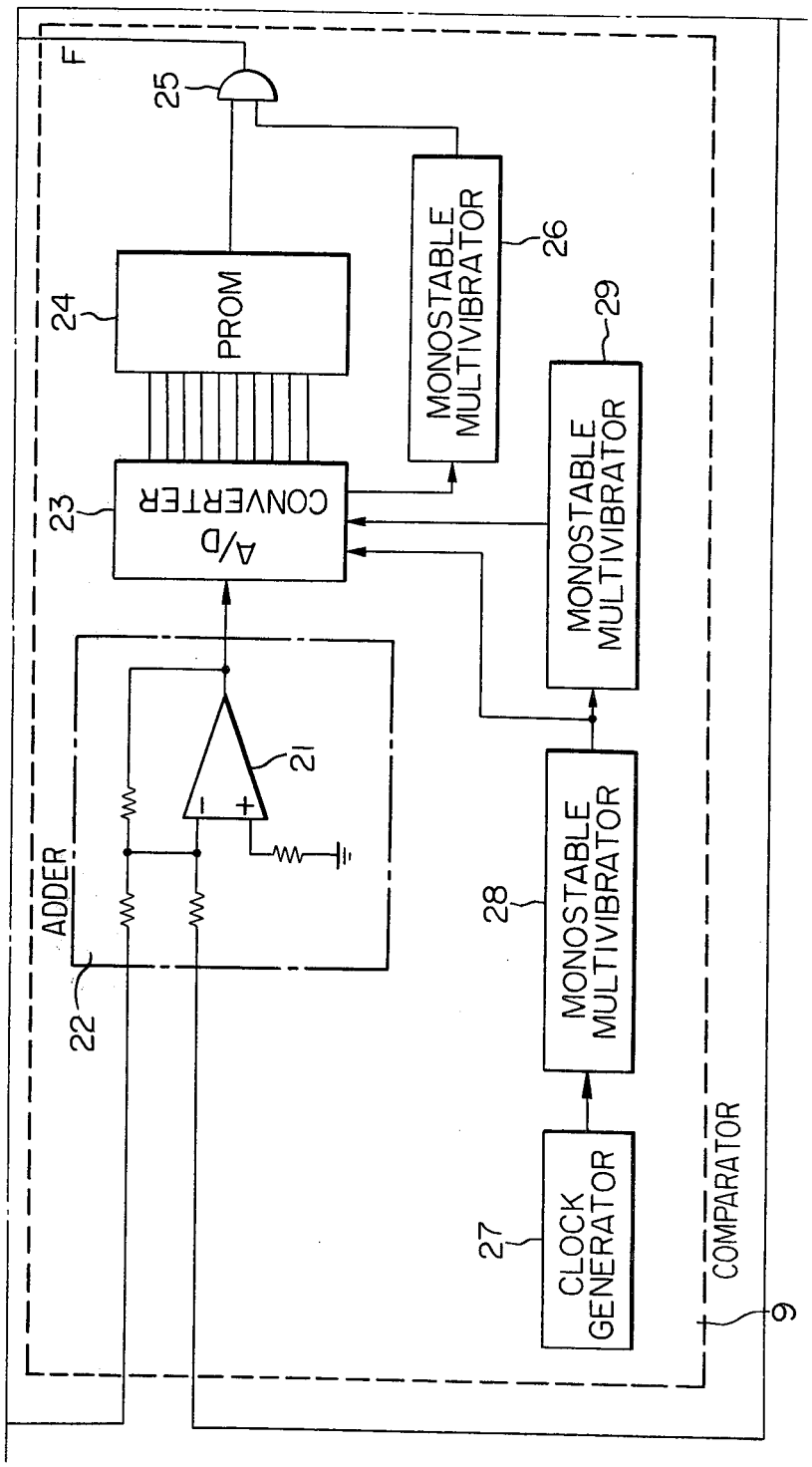

Next referring to FIG. 7, the analog circuit components of which are constituted the servo system shown in FIG. 6 will be described in detail. The servo system shown in FIG. 7 has the function of bringing the rotational speed of a motor to a set point. The command voltage representing a desired rotational speed of the motor is set by sliding a slider 13' of a variable resistor 13 in the command generating means 5. The actuating signal from the actuating signal generating means 7 is applied to one of the inputs of the analog switch 10. To the other input is applied through a variable resistor 10' a 0 volt voltage representing the value obtained by dividing or a command voltage by the gain of the controlled system 8. In response to the control input from the monostable multivibrator 11 which is of the retrigerable type, the analog switch 10 gives the zero voltage or the constant voltage to the adder 12. The adder 12 comprises an operational amplifier 14 and resistors and has the function of adding to the command A the actuating signal C, the zero voltage or the constant voltage. The actuating signal generating means 7 comprises an operational amplifier 15 and its associated resistors and has the function of generating the actuating signal C which is the sum of the secondary command variable B and the controlled variable D which is inverted.

The controlled system 8 comprises an amplifier 16, a motor 17 the rotational speed of which is controlled, a tachogenerator 18 adapted to measure the rotational speed of the motor 17 and an inverting amplifier 20 comprising an operational amplifier 19 and its associated resistors so as to invert the output from the tachogenerator 18, this inverted output being the controlled variable D.

The comparator 9 comprises an adder 22 which in turn comprises an operational amplifier 21 and its associated resistors, an analog-to-digital converter with sampling hold 23, PROM 24, a gate 25, a monostable multivibrator 26, a clock generator 27 and monostable multivibrators 28 and 29. The adder 22 adds the command A to the controlled variable D which is inverted in polarity. The monostable multivibrator 28 generates "L" pulse with a 6 microsecond pulse width in response to the negative going edge of the output of the clock generator 27. In response to the positive edge of the output from the monostable multivibrator 28, the monostable multivibrator 29 generates "H" pulse with a 1 microsecond pulse width. In response to the 6 microsecond "L" pulse of the monostable multivibrator 28, the A/D converter 23 samples and holds the result obtained by subtracting the controlled variable D from the command A and starts the A/D converstion in response to the one-microsecond "H" control pulse from the monostable multivibrator 29 so that the output may be derived from the A/D converter 23 after 8 microseconds. Thus, the analog signal ranging from +10V to +0.02V is converted into the digital signal represented by "000H" (H indicates the hexadecimal notation) to "1FEH"; the analog signal ranging between −0.02V and −10V, the digital signal between 200H and 2FEH; and the analog signal 0V, the digital signal "1FFH".

PROM 24 (programmable read only memory) is so programmed that in response the address input "1FEH", "1FFH" or "200H", "H" output signal may be derived. Next referring further to FIG. 8, the mode of operation of the first embodiment will be described. In the wave forms shown in FIG. 8, the polarities of the signals are not necessarily same as FIG. 7 and are shown in such a way that their physical relations may be readily understood. It is assumed that until $T_1$ there is no difference at all between the command A and the controlled variable D. When a step change in the command A occurs at $T_1$, the output or the secondary command variable B of the secondary command variable generating means 6 reaches a new secondary command variable A +0, which is equal to the new command. The output or the actuating signal of the actuating signal generating means 7 which is obtained by subtracting from the secondary command variable B the controlled variable D or the negative output from the inverting amplifier 20 of the controlled system 8, is applied to the controlled system 8 so that the controlled variable D approaches the command A. In response to the negative edge of the status signal representative of the end of conversion by the A/D converter 24 after $T_1$, the output of the A/D converter 24 is established, and it is detected that there is a difference between the command A and the controlled variable D. As a result, the output from the gate 25 remains "L". Since no trigger pulse is derived from the gate 25, the monostable multivibrator 11 in the secondary command variable generating means 6 is reset at $T_2$ so that the output changes to the "H" level. From $T_2$ the output from the analog switch 14 is switched to the actuating signal C so that the output from the adder 12 in the secondary command variable generating means 6 becomes the sum of the command A and the actuating signal C. That is, the secondary command variable B increases.

At $T_3$ the difference between the command A and the inverted controlled variable D becomes 0±1. After the output from the A/D converter has been established, in response to the trigger pulse from the gate 25, the monostable multivibrator 11 in the secondary command variable generating means 6 is triggered so that the output therefrom remains at the "L" level. In response to this "L" level output, the analog switch 10 adds the input 0V to the adder 12 through the variable resistor 10'. As a result, at $T_4$, the secondary command variable B approaches the command A +0 so that the overshoot of the controlled variable D may be avoided. If the monostable multivibrator 11 is not retriggered its output is restored to "H" level as indicated by the broken lines.

Also, the monostable multivibrator 11 holds the previous state at a period when the A/D converting outputs are yet indetermined. When the controlled variable D deviates from the command A, for example, by disturbance the operation proceeding from the time $T_2$ is repeated from $T_5$.

In the prior art servo system without the comparator 9, the monostable multivibrator 11 and the analog switch 10, after $T_4$ the secondary command variable B is such that the controlled variable D is caused to increase as indicated by the broken lines so that the overshoot of the controlled variable D results as indicated by the broken lines. However, when the comparator 9 and the analog switch 10 are incorporated, the overshoot may be avoided, the transient or settling time may be shortened.

So far it has been described that when there is no difference between the command A and the controlled variable D, the analog switch 10 picks up the 0V input from the variable resistor 10' so that the secondary command variable B becomes equal to the command A +0. When the gain of the loop from the actuating signal C to the variable command D in the controlled system 8 is known, the output applied instead of 0V to the analog switch 10 may be previously set to the value obtained by dividing the command A by the loop gain. Thus when the controlled variable D is A ±1, the secondary command variable B or the output from the secondary command variable generating means 6 becomes the command+(command/loop gain).

That is, the variations in amplitude of the secondary command variable B may be reduced so that the ripple of the controlled variable D may be minimized accordingly.

FIG. 9 shows the block diagram of a second embodiment of the present invention wherein the rotational speed of a motor is subjected to the sampling control. The command signal generating means 5 comprises a resistor, and in response to the pulses applied to the terminal 5', the command A is set.

The secondary command variable generating means 6 comprises an adder 30 and a register 31 to which are applied pulses through the terminal 31' in response to the variations in the command A. The actuating signal generating means 7 comprises a subtracter. The controlled system 8 comprises a holding circuit, a digital-to-analog (D/A) converter, an amplifier, a servomotor, a tachogenerator and an analog-to-digital (A/D) converter. The comparator 9 comprises a comparison circuit 32 and a gate 33.

The servo system further includes a switch 34 for selectively interrupting the transmission of the secondary command variable B to the actuating signal generating means 7, a switch for selectively interrupting the transmission of the actuating signal C to the controlled system 8, and a switch 36 for selectively switching the transmission of the controlled variable D from the controlled system 8 to the comparator 9 or to the actuating signal generating means 7. These switches are so operatively interconnected that first the contact 36a of the switch 36 is closed, then the contact 36b of the switch 36 and the switch 34 are closed and finally the switch 35 is closed. And the above sequence of switching operations is cycled.

For the sake of simplicity of the explanation, it is assumed that the digital quantity "1" of the controlled variable D represents 25 rpm, the gain of the controlled system 8 be 18, and the time constant be 0.4 sec. The digital quantities in the control loops are represented by the decimal numbers.

The mode of operation of the second embodiment with the above construction and circuit constants is as follows. When the command represents 2,000 rpm (25×80), its digital representation is "80". That is, in the stationary state, the command A is "80" and the controlled variable is also "80". The register 31 in the secondary command variable generating means 6 stores (80/18)+80=85.

It is assumed that the command A be changed to "64" representing 1,600 rpm. Then in response to the pulse signals applied to the terminals 5' and 31', the contents in the registers in both the command generating means 5 and the secondary command variable generating means 6 are changed to "64". When the contact 36a of the switch 36 is closed, the controlled variable D which is "80" is compared with the command A which is now "64" in the comparator 9 or more specifically in the comparison circuit 32. Since there is a difference between the command "64" and the controlled variable "80", the gate 33 provides no signal in response to which the contents in the register 31 in the secondary command variable generating means 6 may be changed. When the contact 36b of the switch 36 is closed while the switch 34 is closed, the actuating signal generating means 7 subtracts from the secondary command variable B which is now "64" the controlled variable D which is "80" so that the output or the actuating signal C becomes "−16". When the switch 35 is closed, the actuating signal C which is now "−16" is applied to the controlled system 8 so that the deceleration of the motor results. At the same time, the adder 30 in the secondary command variable generating means 6 adds the actuating signal C which is "−16" to the command A which is now "64" and the sum "48" is stored in the register 31 in the secondary command variable generating means 6. In the next sampling period which follows 20 microseconds after the sum has been stored in the register 31, the contact 36a of the switch 36 is opened. Assume that at this time the controlled variable D is reduced to "78". Then since there is a difference between the command A and the controlled variable D, the gate 33 in the comparator 9 will not generate the signal in response to which the contents in the register 31 may be changed. When both the contact 36a and the switch 34 are closed, the actuating generating means 7 subtracts the controlled variable D which is now "78" from the secondary command variable B which is now "48" at the end of the preceding sampling cycle. The difference "−30" or the actuating signal C is greater than the actuating signal C which was "−16" in the preceding sampling cycle so that the deceleration of the motor results again as the switch 35 is closed. At the same time, the adder 30 in the secondary command variable generating means 6 adds the actuating signal C which is now "−30" to the command A which is "64" and the sum is stored in the register 31 in the secondary command variable generating means 6. The above described operation is cycled until the controlled variable D becomes "64"; that is, there is no difference between the command A and the controlled variable D. Then the switch 36 closes its contact 36a so that the comparison circuit 32 in the comparator 9 compares the command A with the controlled variable D. The difference is now "0" so that the gate 33 generates the signal in response to which the contents in the register 31 in the secondary command variable generating means 6 changes to "64" and the transfer of the output from the adder 30 to the register 31 is inhibited.

When the contact 36b of the switch 36 and the switch 34 are closed, the contents "64" in the register 31 in the secondary command variable generating means 6 and the controlled variable D which is now "64" are transferred into the actuating signal generating means 7. Their difference is now "0" so that the actuating signal C which is now "0" is applied to the controlled system 8 when the switch 35 is closed. Since the actuating signal C is "0", no driving torque is applied to the motor in the controlled system 8 so that the motor is gradually decelerated.

When the rotational speed of the motor deviates from its set point so that the controlled variable D deviates from "64", the above described operation is cycled until the controlled variable D may approach the command A. When disturbance is applied to the motor due to the variations in the load so that the rotational speed drops, the above described operation is cycled until the difference between the command A and the controlled variable D becomes zero except for the operation of setting the command A in the register 31 in response to the pulse signals applied to the terminal 31' or the operation of changing the command A.

Figure 10:
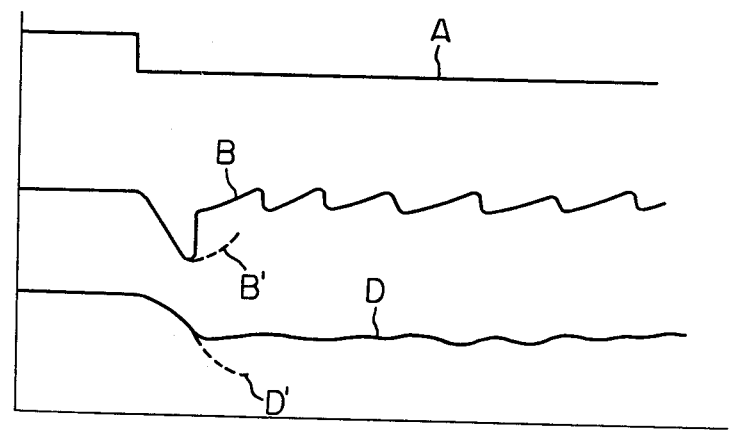
FIGS. 10 and 11 show wave forms used for the explanation of the mode of operation of the servo system shown in FIG. 9.

FIG. 10 shows the control sequence when the command A is decreased. In response to a step change in the command A, the secondary command variable B undershoots and the controlled variable D follows the secondary command variable B. Since the secondary command variable B is forced to set to the same value as the command A the overshoot of the controlled variable D may be prevented when it approaches the command A. Unless the secondary command variable B is not forced to set to the value same as the command A, the overshoot of the controlled variable D would result as indicated by the broken line curve D' as the controlled variable D follows the secondary command variable B. In this case, the secondary command variable B would change as indicated by the broken line curve B'.

Figure 11:
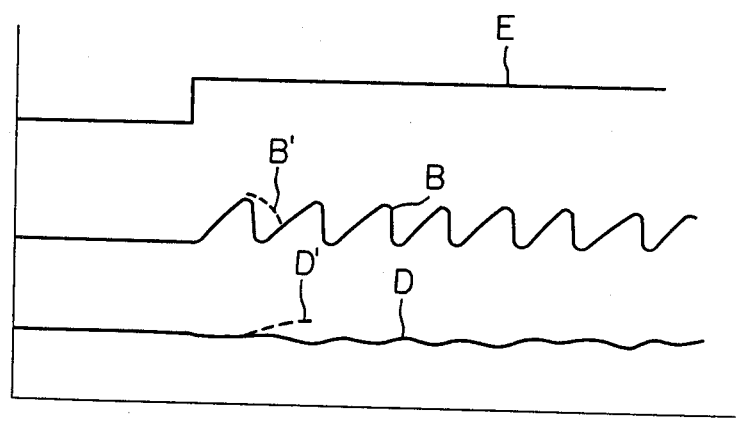

FIG. 11 shows the control or the restoration to the specified rotational speed when disturbance applied to the system changes due to the variations in the load on the motor. The secondary command variable B and the controlled variable D change as indicated by the solid line curves B and D, respectively. Unless there is not provided means for forcibly setting the secondary command variable B to the same value as the command A, the secondary command variable B and the controlled variable D would change as indicated by the broken line curves B' and D', respectively.

Next referring to FIG. 12, the second embodiment of the present invention will be described in more detail. The command generating means 5 comprises a switch 37 adapted to represent the command or a specified roational speed of a motor in 8-bits and a D flip-flop 38 adapted to hold the command A in response to the timing signal. In response to the command or the rotational speed expressed in 8-bits, the switch 37 generates the output represented in the hexadecimal notation system as follows:

| rpm | | output from switch 37 |
|---|---|---|
| 3 150 | 3 175 | FFH |
| 1 975 | 2 000 | DOH |
| 1 575 | 1 600 | COH |
| 0 | 2.5 | 80H |
| −2.5 | 0 | 7FH |
| −3.2 | −3.175 | 00H |

Figure 12B:
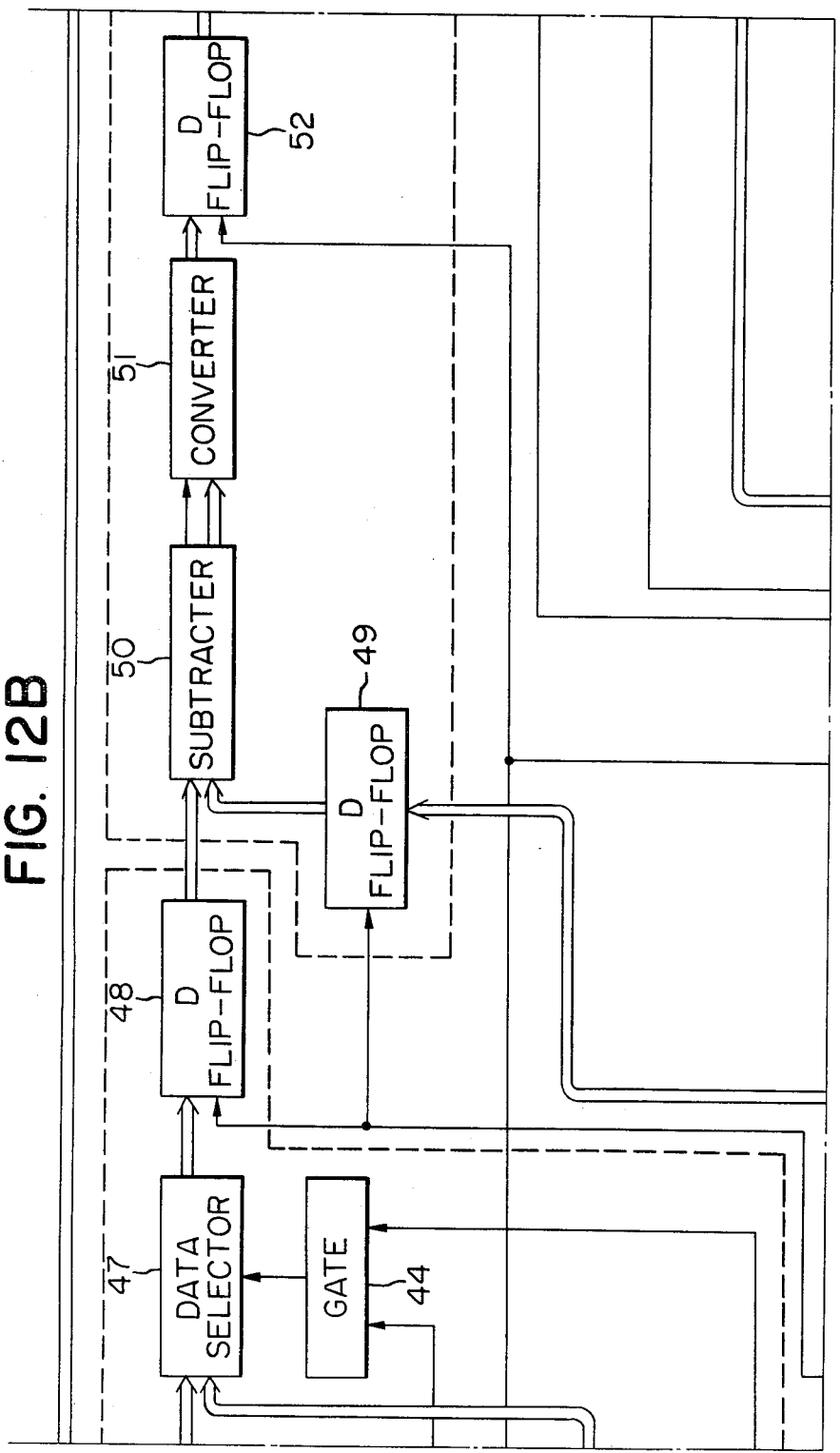
Figure 12D:
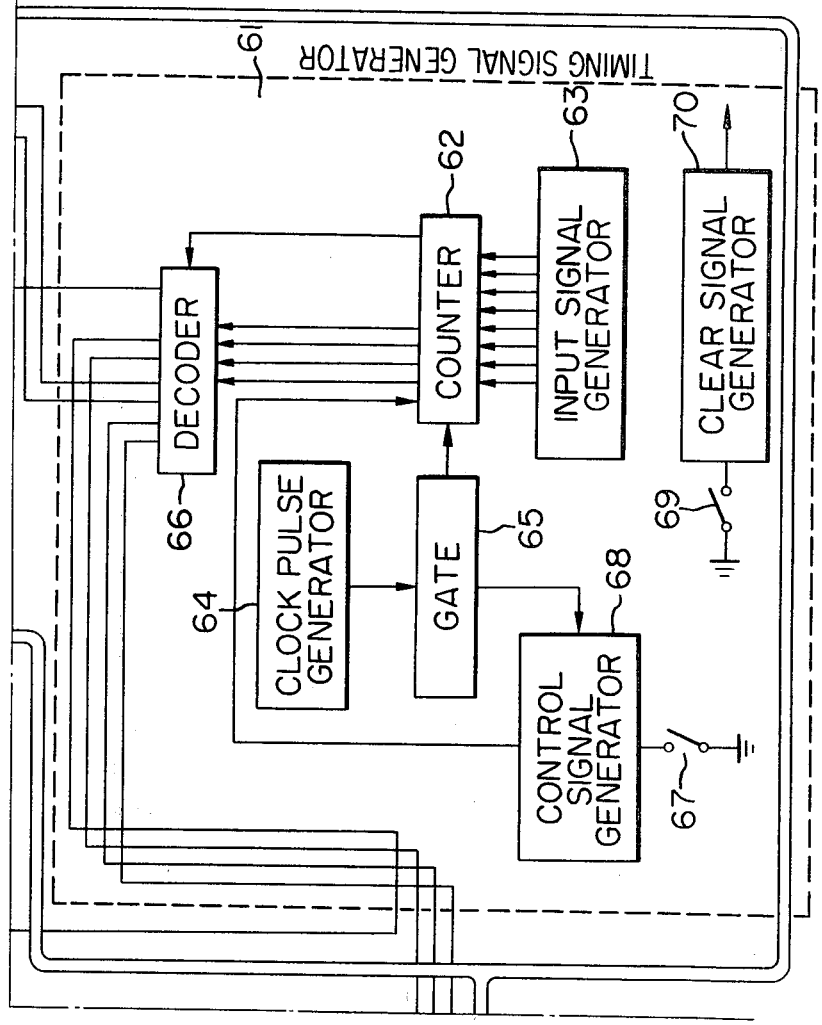

The double-track channels shown in FIG. 12 transmit 8-bits control signals.

The secondary command variable generating means 6 comprises a D flip-flop 39 for holding the command A, a code converter 41 for depressing an overflow of the added value, a comparator 42 which compares the output from the flip-flop 38 with that from the flip-flop 39 and generates the output "1" when they coincide with each other or the output "0" when they does not coincide or when the command A has been changed, a second D flip-flop and a gate, a edge trigger D flip-flop 43 comprising a D flip-flop and a gate and adapted to be triggered by the positive edge of the output of the comparator 42, a gate 44 which generates the output "1" when either the flip-flop 43 or the comparator 9 gives the input "1" to it, an 8-bits switch 45 adapted to generate the signal representative of the value "00H" which is to be added to the command A or the value obtained by dividing the reference input by the loop gain of the controlled system 8 which is also to be added to the command A, an 8-bits adder 46 for adding the output from the switch 45 to the command A or the output from the flip-flop 39, a data selector 47 which selects the output from the adder 46 as an output when the output from the gate 44 is "1" or selects the output from the converter 41 as an output when the gate 44 delivers the signal "0", and a D flip-flop 48 which holds the output from the selector 47 in response to the timing signal, the contents in the flip-flop 48 being the secondary command variable B which has been established.

The actuating signal generating means 7 comprises a D flip-flop 49 adapted to hold the controlled variable D in response to the timing signal, a subtracter 50 for subtracting the output of the flip-flop 49 from the output of the flip-flop 48 in the preceding stage 6, a code converter 51 adapted to depress an overflow of the subtracted value, a D flip-flop 52 adapted to hold the output from the converter 51 in response to the timing signal, a switch 53 adapted to generate the signal representative of "80H" and an adder 54 adapted to add the output from the flip-flop 52 to the output from the switch 53.

The controlled system 8 comprises a digital-to-analog converter 55 for converting the analog output from the adder 54 into a digital quantity, a power amplifier 56 for driving a motor 57, the motor 57 which is to be controlled, a tachogenerator 58, a sample holding circuit 59 which is adapted to pass the output from the tachogenerator 58 so as to smooth it and amplify the smoothed output through a buffer amplifier, thereby effecting the sample holding in response to the timing signal, and an analog-to-digital converter 60 adapted to converting the analog output from the sample holding circuit 59 into a digital quantity. The output from the A/D converter 60 comprises 8-bits. The above described relations between the rotational speeds in rpm and their hexadecimal notations described above may be also held in this system.

The servo system further includes a timing signal generator 61 for generating the control signals which control the command generating means 5, the secondary command variable generating means 6, the actuating signal generating means 7 and the controlled system 8. It comprises a counter 62, an input data generator 63 for generating the input data to be stored in the counter 62, a clock pulse generator 64, a gate 65 for controlling the transmission of clock pulses from the clock pulse generator 64 to the counter 62, a decoder 66 for generating timing signals by receiving the 4 bits output control signal from the counter 62, a switch 67 for starting the control, a control signal generator 68 adapted to generate not only the external load signal ("0" pulse) to be applied to the counter 62 but also the control signal for controlling the gate 65, a power on-off switch 69 and a clear signal generator 70 adapted to generate the signals in response to which the flip-flops and the counters are reset after the on-off switch 69 has been thrown, the clear signals being applied to the clear terminals of the flip-flops and counters. It is to be noted that in order to stop the motor 57, the command A is changed to "80H" which represents 0 rpm.

The comparator 9 comprises a D flip-flop 71 adapted to hold the controlled variable D transmitted from the A/D converter 60 and a comparison circuit 72 adapted to compare the controlled variable D with the command A so that when they coincide with each other it generates the output "1" at its output terminal.

Next the mode of operation of the servo system with the above described construction will be described. The command A is held in the flip-flop 38 in the command generating means 5 and also in the flip-flop 39 in the secondary command variable generating means 6. The comparator 42 compares the contents stored in the flip-flops 38 and 39 so as to detect whether or not they coincide with each other; that is, whether or not the command A has been changed. When the command A remains unchanged, the adder 40 adds the command A to the actuating signal C which is the output from the D flip-flop 52 in the actuating signal generating means 7 at the end of the preceding sampling cycle. Any overflow of the added value is detected from the most significant bit (MSB) of the output of the command A and the actuating signal C and the carry signal output of the adder 40 in the code converter 41, and the added value is compensated to depress the overflow. The comparator 9 compares the command A with the controlled variable D from the A/D converter 60. When they are coincident with each other, the selector 47 selects the output from the adder 46 which adds the output "00H" from the switch 45 to the command A. When they are not, the selector 47 selects the output from the converter 41 which is the sum of the command A and the actuating signal C. The selected output or the actuating signal B is stored in the D flip-flop 48 and is subtracted from the controlled variable stored in the flip-flop 49 in the subtracter 50 in the actuating signal generating means 7. Any overflow of the added value is detected from the most significant bit (MSB) and the carry output of the subtracter 50 and the added value is compensated to depress the deviation and the depressed and added value is stored in the D flip-flop 52 of the actuating signal generating means 7. The output from the converter 51 is stored in the flip-flop 52.

In the subtraction carried by the subtracter 50, when the output from the flip-flop 48 or the secondary command variable B is smaller than the actuating signal C which is a subtrahend, the output from the subtractor 50 is a 2's complement of the difference. The relations between the differences in the decimal notation system and their hexadecimal notations are as follows:

| difference in decimal notation system | hexadecimal notations of the output from the subtracter 50 |
| --- | --- |
| 127 | 7FH |
| 1 | 01H |
| 0 | 00H |
| −1 | FFH |
| −2 | FEH |
| −128 | 80H |

Therefore when the sum of the decimal numbers becomes negative, the output from the adder 40, which adds the command A to the actuating signal C, becomes (the command A) minus (the absolute value of the actuating signal C).

The adder 54 adds the output "80H" from the switch 53 to the output from the flip-flop 52. The relation between the output of the adder 54 and revolution number makes same as that between the command A of the switch 37 and revolution number, and when the output of the D/A converter of the controlled system 8 is 0 or the actuating signal C is 00H, the controlled system 8 is controlled at a relation in which the motor does not produce any torque.

So far it has been described that when the controlled variable D approaches the command A, switch 45 delivers the output "00H" to the adder 46 so as to be added to the command A, thereby obtaining the secondary command variable B. However, when the gain of the loop from the actuating signal C to the controlled variable D is known, the switch 45 may be so arranged as to deliver the output representative of (command A)/loop gain whereby when the command A has been changed or when the controlled variable D has approached the command A, the secondary command variable B becomes (command A)+(command a/loop gain)

Then, the variations in amplitude as shown in FIG. 10 may be minimized, whereby the ripple of the controlled variable D may be minimized accordingly.

In this embodiment, first whether or not the controlled variable D is equal to the command A is detected and when the controlled variable D approaches the command A, the secondary command variable B is set to the command A. When the controlled variable D deviates from the command A, the actuating signal C is added to the command A. Thus the control operation is carried out.

In a third embodiment of the present invention, when the controlled variable D approaches the command A after the latter has been changed, the secondary command variable B is changed to the command A and thereafter will remains unchanged as will be described in detail below.

Referring to FIG. 13, the command generating means 5, the secondary command variable generating means 6, the actuating signal generating means 7, the controlled system 8 and the comparator 9 are similar in both construction and mode of operation to those shown in FIG. 9 so that no further description thereof shall be made. When the command A is changed, a new command A is set into the register 31 by applying the pulses at the terminal 31'. The command change signal is applied to the terminal 5' of the command generating means 5 so that "01H" fed from the terminal 73' may be set in a counter 73. When "01H" is set in the counter 73 and the comparison circuit 32 of the comparator 9 detects the coincidence between the command A and the controlled variable D, the coincidence signal of the comparison circuit 32 is transmitted through the gate 33 to the secondary command variable generating means 6 and the counter 73, the command A is set in the secondary command variable generating means 6, the content of the counter 73 is subtracted unity and set 00H and the gate 33 is closed. Therefore, it is detected whether or not the controlled variable D has approached the command A after the latter has been changed and then the servo system becomes the operation same as the servo system in the prior art as shown in FIG. 1. Then by one operation described above, when the level of disturbance applied to the controlled system 8 is low, the ripple may be avoided and the steady state error may be reduced to a minimum.

Figure 14A:
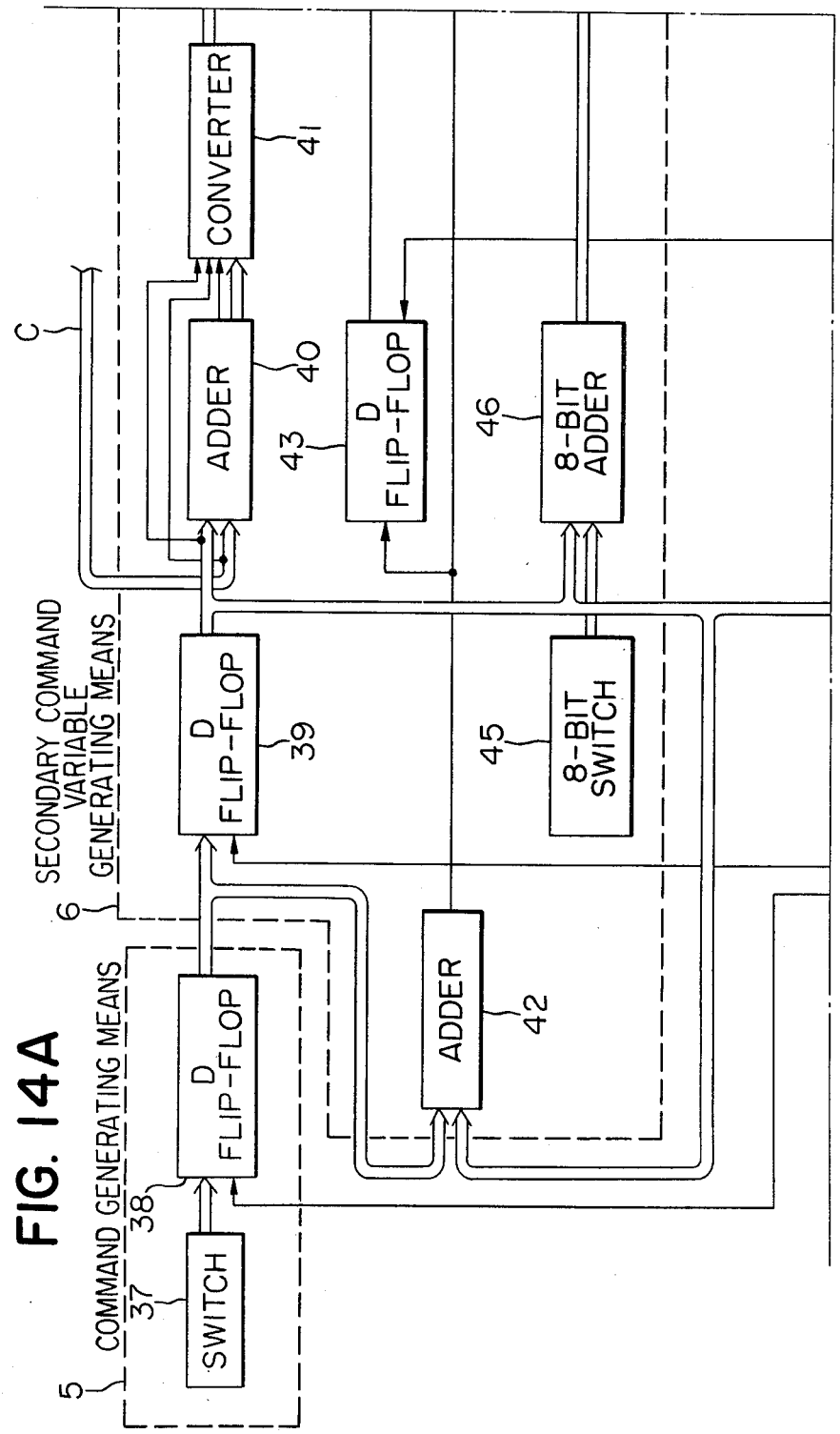
Figure 14B:
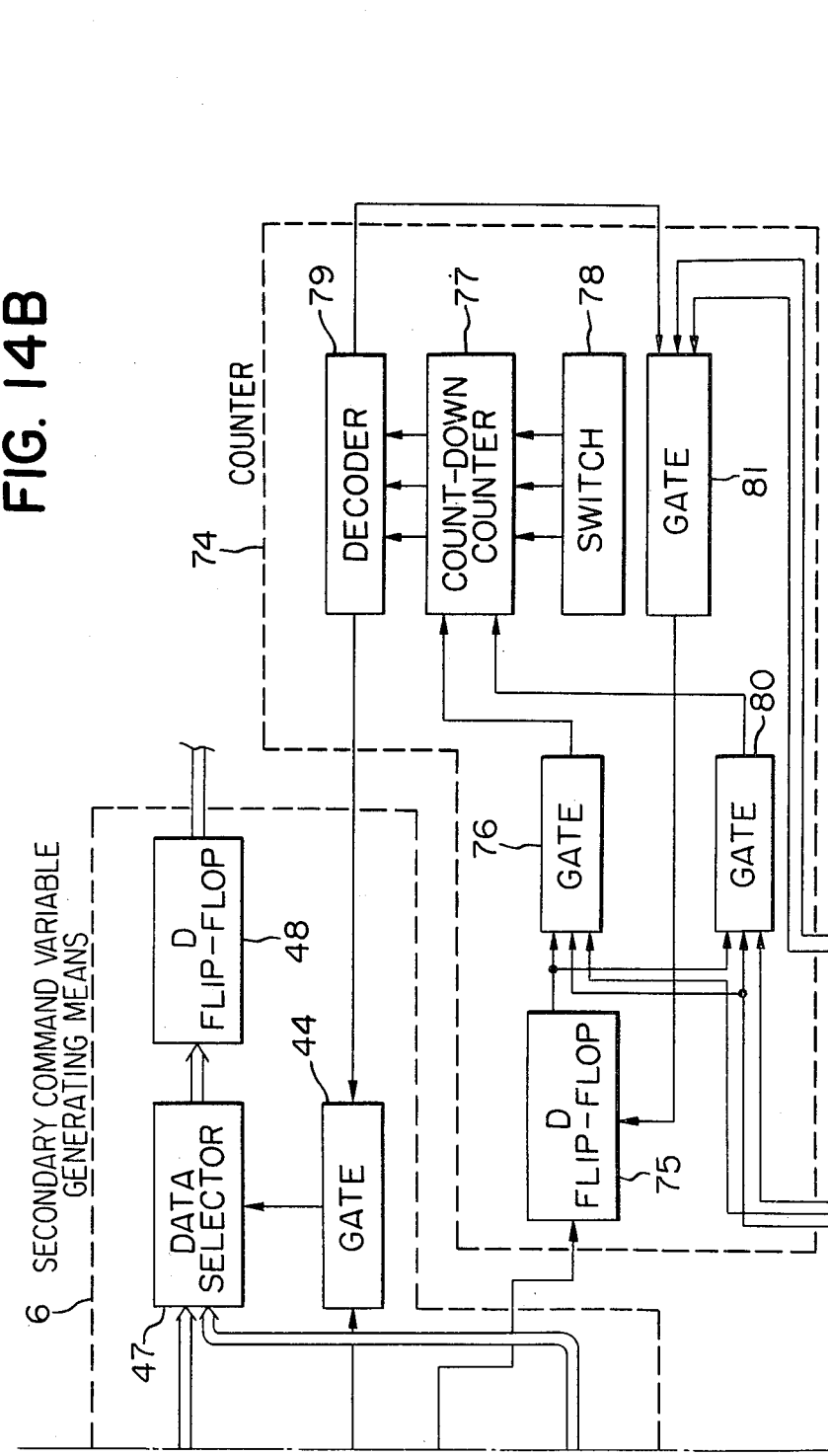

Referring further to FIG. 14, the third embodiment will be described in more detail. FIG. 14 shows part of the embodiment shown in FIG. 13 and the same reference numerals are used. The counter 74 shown in FIG. 14 comprises a D flip-flop 75 adapted to deliver the output "1" when the output pulse from the adder 42 is "0" when the command A is to be changed, a gate 76 which delivers the output "0" when the inputs from the flip-flop 75 and the comparison circuit 72 and the timing signal are all "1", a count-down counter 77 which sets "01H" in response to the "0" output pulse from the gate 74, a switch 78 adapted to generate the signal representative of the modifying number or unity a decoder 79 comprising a decoder section and a gate which output is unity when modifying numbers and 0 are set in its terminals, a gate 80 for generating output pulse rising in the back edge of the timing pulse when the output of the D flip-flop 75 is unity and the output of the comparison circuit 72 of the comparator 9, and a gate 81 which delivers the output pulse "0" when the output from the comparison circuit 72 is "1", the output from the decorder 79 is "0" and the timing signal exsists and resets the D flip-flop 73 after the modifying numbers are satisfactory.

While in the servo system shown in FIG. 13, the secondary command variable B is approached only once to the command A after the latter has been changed, in the third embodiment shown in FIG. 14, the switch 78 permits the secondary command variable B to approach the command A as many times as required.

What is claimed is:

1. A servo system comprising
   a command generating means,
   a secondary command variable generating means for generating a secondary command variable by adding an actuating signal to the command,
   an actuating signal generating means for generating said actuating signal by subtracting from said secondary command variable a controlled variable which represents the output of a controlled system, said actuating signal being applied to said controlled system,
   a comparator means adapted to compare said command with said controlled variable, whereby when said controlled variable approaches said command, a coincidence signal is delivered from said comparator means to said secondary command variable generating means so as to change the output of said secondary command variable generating means.

2. A servo system as set forth in claim 1 wherein said secondary command variable means includes switching means connected to setting signal generating means for generating desired setting signals in response to the coincidence signals from said comparator means, outputs of said setting signal generating means being added to the command to become said secondary command variable.

3. A servo system as set forth in claim 2 wherein said setting signal generating means includes means for generating zero signals.

4. A servo system as set forth in claim 2 wherein said setting signal generating means includes means for generating the result obtained by dividing the command by the loop gain from the output of the actuating signal generating means through the controlled system to the input of said actuating signal generating means.

5. A servo system as set forth in claim 1 wherein said secondary command variable generating means includes a monostable multivibrator which generates a signal which last for a specified time interval when said secondary command variable generating means receives the coincidence signal from the comparator means and a switch for selecting values addible to said command during a setting time in response to the output from said monostable multivibrator.

6. A servo system as set forth in claim 1 further comprising a first switch adapted to selectively switch the application of said controlled variable to said comparator means or said actuating signal generating means, a second switch interposed between said secondary command variable generating means and said actuating signal generating means, and a third switch interposed between said actuating signal generating means, the controlled system and said secondary command variable generating means, whereby said first switch transmits said controlled variable to said comparator means which compares said command with the controlled variable, thereafter the first switch is so actuated as to transmit said controlled variable to said actuating signal generating means, thereafter said second switch is closed so as to cause said actuating signal generating means to subtract said controlled variable from said secondary command variable and finally said third switch is closed so as to transmit said actuating signal from said actuating signal generating means to said secondary command variable generating means and to said controlled system.

7. A servo system as set forth in claim 1 further comprising a counter which is set to "1" in response to the command change signal applied to said command generating means and a gate circuit which is responsive to the output from said counter for transmitting the output from said comparator means, whereby in response to said coincidence signal from said comparator means the output from said secondary command variable generating means is caused to coincide with said command and at the same time the output of said counter is set to "0", thereby interrupting the output from said gate circuit and changing only once the output from said secondary command variable generating means to said command after the latter has been changed.

* * * * *

UNITED STATES PATENT OFFICE
CERTIFICATE OF CORRECTION

Patent No. 4,207,506         Dated    June 10, 1980

Inventor(s)   Hisashi Sasaoka, et al

It is certified that error appears in the above-identified patent and that said Letters Patent are hereby corrected as shown below:

In the Drawings, in Fig. 12E: "SUMPLE HOLDING CIRCUIT" should be --SAMPLE HOLDING CIRCUIT--.

in FIG. 12B: "SUBTRACTER" should be --SUBTRACTOR--.

in FIG. 6: "ACTUATING SIGNAL GENERATIN MEANS" should be --ACTUATING SIGNAL GENERATING MEANS--.

in FIG. 1: "SUBTRACTER" should be --SUBTRACTOR--.

Column 2, line 32: "output doof" should be --output d of--.

lines 33 and 34: "subtracter" should be --subtractor--.

Column 6, line 34: "subtracter" should be --subtractor--.

Column 8, line 48: "roational" should be --rotational--.

Column 9, line 27 & Column 10, lines 42, 45, 50, 59: "subtracter" should be --subtractor--.

UNITED STATES PATENT OFFICE
CERTIFICATE OF CORRECTION

Patent No. 4,207,506      Dated June 10, 1980

Inventor(s) Hisashi Sasaoka, et al

It is certified that error appears in the above-identified patent and that said Letters Patent are hereby corrected as shown below:

Column 13, line 23: "switlch" should be --switch--.

Signed and Sealed this

Thirteenth Day of January 198

[SEAL]

Attest:

SIDNEY A. DIAMOND

Attesting Officer      Commissioner of Patents and Tradem